Figure 2:
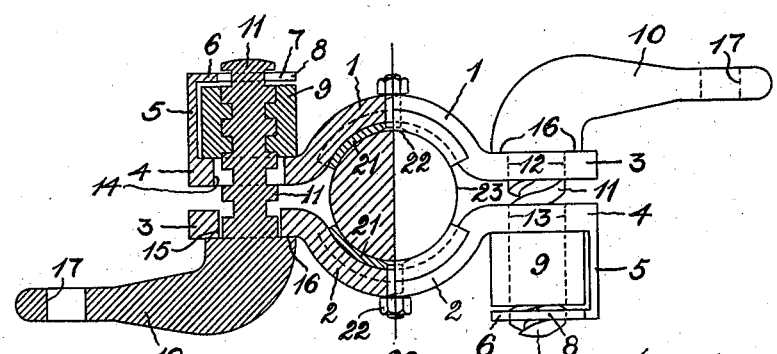

H. J. SMITH.
GRIPPING OR CLAMPING DEVICE.
APPLICATION FILED AUG. 6, 1910.

1,014,781.

Patented Jan. 16, 1912.

Witnesses:
Chas. Ovendale
A. Thompson

Inventor:
Henry Jeremiah Smith

UNITED STATES PATENT OFFICE.

HENRY JEREMIAH SMITH, OF JOHANNESBURG, TRANSVAAL.

GRIPPING OR CLAMPING DEVICE.

1,014,781. Specification of Letters Patent. Patented Jan. 16, 1912.

Application filed August 6, 1910. Serial No. 575,888.

*To all whom it may concern:*

Be it known that I, HENRY JEREMIAH SMITH, a subject of the King of Great Britain, and resident of Johannesburg, Transvaal, have invented certain new and useful Improvements in Gripping or Clamping Devices, of which the following is a specification.

This invention has reference to gripping or clamping devices, and is especially adapted for use in handling or removing and replacing the stems of gravity stamps and other more or less heavy vertical shafts, columns, pipes or the like. The device can also be adapted for gripping cam shafts or other horizontal shafts or cylindrical bodies or members for manipulating the same as may be required.

As is well known, difficulty is experienced with the means or devices presently used for gripping a vertical shaft or its equivalent, clamps and the like being usually bolted or otherwise fixed around the shaft for handling the same by means of suitable tackle.

Now the object of the invention is to obviate such difficulty and to construct an efficient grip or clamp in a simple and inexpensive manner adapted for the purposes stated. Further my improved gripping or clamping device is also applicable for other analogous purposes, as for example, the drawing together of the ends of two wire ropes for the purpose of splicing or repairing the same and for other similar purposes.

The invention will be more fully described by aid of the accompanying drawing wherein—

Figure 1:
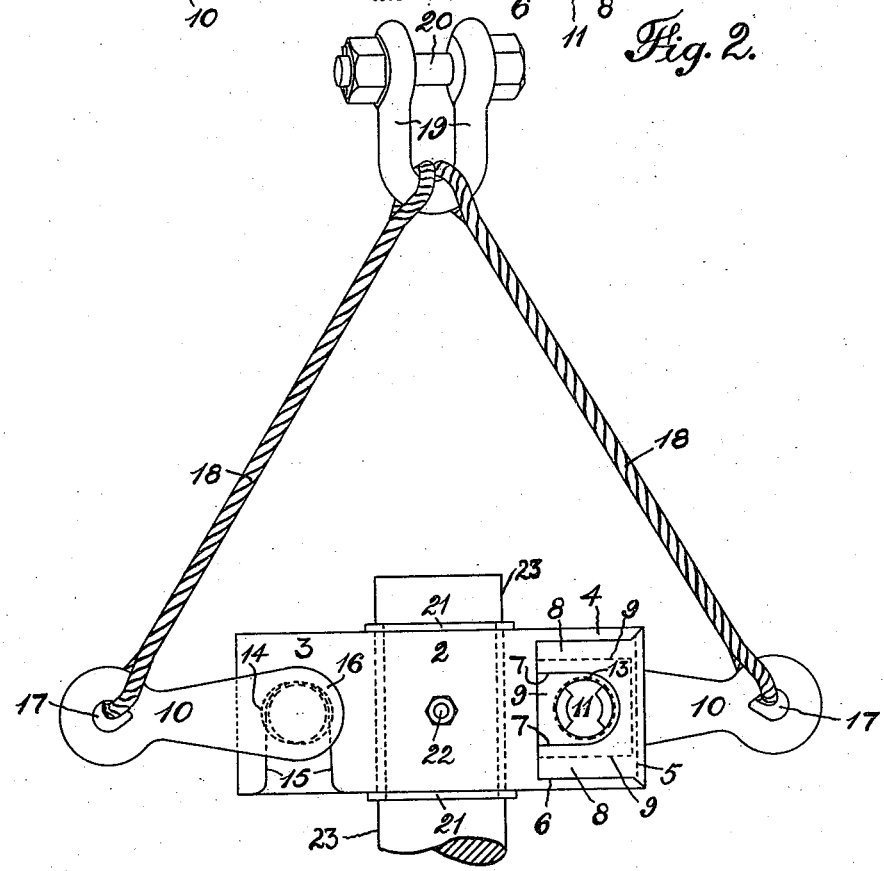

Figure 1 represents the device in side elevation, and Fig. 2 represents it in half sectional plan, with the shackle 19 and wire ropes 18 removed.

The drawing illustrates the device in a form in which I prefer to construct it for handling or manipulating the stems of stamps and other vertical shafts, cylinders or pipes.

1 and 2 represent a pair of clamping members. Each half or member 1, 2 of the clamp, as shown, consists of a suitably curved or hollow hemi-cylindrical part fashioned at each end with a perforated lug or projection 3, 4. The lug or projection 4 on one end of each half of the clamp, 1, 2 is bent outward at right angles as indicated at 5, and then inward or parallel to the lug 4 as indicated at 6, the inwardly bent portion 6 being preferably bifurcated or constructed with an open-ended slot 7 forming said parts 6 into two parallel pieces 8 with an intervening gap or space. As shown in the drawing when the halves of the clamp 1, 2 are arranged in correct relative position the lug 4 upon which the projecting parts 5, 6 are formed are placed at opposite ends and sides of the clamp. In each of the spaces or recesses formed on the outside of the lugs 4 by the parts 5, 6 is placed a nut or interiorly threaded piece 9 which is incapable of rotary motion due to one of the flat surfaces thereof engaging the flat inside surface of part 5.

10 represent a pair of arms or levers, one for each end of the clamp. These arms or levers 10 are formed with screw-threaded projections 11 which project through the perforated lugs 3, 4, and have screw-threaded engagement with the nuts 9. The projections 11 are preferably provided with double threads of a suitable course pitch, and the nuts 9 constructed to correspond. The holes 12, 13 in the lugs 3, 4 at the one side of the device are preferably cylindrical and slightly exceed the outside diameter of the screw-threaded projection 11. The hole 14 in the projection 4 at the other side of the device is preferably made slightly oval, and the perforation 15 in the opposing lug 3 formed as an open-ended slot. This permits the half or member 2 of the clamp to be rotated about its projection 4 in order to place the clamp around the object to be gripped. The screw-threaded projections 11 form shoulders 16 upon the inner ends of the arms or levers 10 which engage the outside of the perforated lugs 3. The arms or levers 10, when the parts of the clamp are assembled, are disposed at opposite sides and ends of the halves 1, 2 of the clamp. The arms or levers 10 at their outer ends are constructed with holes or eyes 17 for attaching thereto preferably wire ropes 18. As shown in Fig. 1 the wire ropes 18 may be attached directly to the outer ends of the arms or levers 10, or they may be connected therewith through the medium of shackles or their equivalent. Instead of using the wire rope 18 chains may be employed. 19 represents a shackle to which the other ends of the wire ropes 18 are attached as shown in Fig. 1; 20 representing the shackle pin which serves for making connection with the operating or lifting tackle.

When it is desired to construct the device so that it can be used for stems, shafts or other objects of different diameters then the halves 1, 2 of the clamp may, as shown in the drawing, be provided with approximately semi-circular bushes or liners, 21. Said bushes may, as shown, be flanged top and bottom and be retained in position by means of countersunk bolts 22. By using bushes or liners of different thickness the diameter of the hole formed between the halves 1, 2 of the clamp may be altered as desired.

In putting the device into operation the arms or levers 10 are moved in a downward direction which has the effect of expanding the halves 1, 2 of the clamp. The half 2 of the clamp is then raised at one end to cause its lug or projection 3 to disengage the screw-threaded projection 11—the oval hole 14 permitting this—which results in the halves 1, 2 moving farther apart. The one half 1 of the clamp is then placed around the stem, shaft or other object 23 and the half 2 is then rotated to place its lug or projection 3 over the screw-threaded projection 11. This movement causes the halves 1, 2 of the clamp to approach each other. The arms or levers 10 on being raised by the ropes 18 or otherwise screw the threaded projections 11 through the nuts 9 and force the halves 1, 2 tightly around the stem, shaft or other object which is thereby securely gripped.

What I claim as my invention and desire to protect by Letters Patent is:

A gripping or clamping device comprising a pair of clamping members having perforated lateral lugs or projections, one of the projections or lugs of each member having projecting parts which form an external recess, a nut so arranged in each of said recesses that the projecting parts prevent it rotating, a pair of arms or levers having projections which pass through the perforations in the ends of the clamping members and have screw-threaded engagement with the aforesaid nuts, the lateral lug or projection of one of the clamping members being constructed with a slot to permit of its disengagement from the projection on the one arm or lever to open the clamp and the perforation in the opposing lug being made oval to permit of said disengagement, and means for connecting the ends of the arms or levers with the operating tackle, as set forth.

In testimony whereof I have signed my name to this specification in the presence of two subscribing witnesses.

HENRY JEREMIAH SMITH.

Witnesses:
W. S. AVES,
CHAS. OVENDALE.